US009813856B1

(12) United States Patent
Ciesla et al.

(10) Patent No.: US 9,813,856 B1
(45) Date of Patent: *Nov. 7, 2017

(54) PROXIMITY LOCATION SYSTEM AND METHOD THEREOF FOR LOCATING A COMMUNICATIONS DEVICE

(71) Applicant: West Corporation, Omaha, NE (US)

(72) Inventors: Lawrence W. Ciesla, Yorkville, IL (US); Ken Davis, Longmont, CO (US); Monica Ann Marics, Boulder, CO (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,136

(22) Filed: Nov. 29, 2016

Related U.S. Application Data

(63) Continuation of application No. 13/593,595, filed on Aug. 24, 2012, now Pat. No. 9,508,254, which is a continuation of application No. 12/050,308, filed on Mar. 18, 2008, now Pat. No. 8,269,607.

(51) Int. Cl.
| | | |
|---|---|---|
| *H04W 4/02* | (2009.01) | |
| *H04W 4/00* | (2009.01) | |
| *H04W 4/22* | (2009.01) | |
| *H04L 12/66* | (2006.01) | |

(52) U.S. Cl.
CPC .............. *H04W 4/02* (2013.01); *H04L 12/66* (2013.01); *H04W 4/008* (2013.01); *H04W 4/22* (2013.01)

(58) Field of Classification Search
CPC ........ G08C 13/00; G08C 15/00; G08C 17/02; G08C 23/04; H04W 4/22; H04W 8/00; H04W 76/007; H04W 68/00; H04W 84/005; G08B 17/00; G08B 29/02
USPC ...... 340/539.11, 539.15, 539.21, 505, 573.1, 340/573.4, 577, 692, 815.45, 825.5, 340/539.12; 455/456.1, 456.6; 128/903, 128/904; 600/300, 301
See application file for complete search history.

(56) References Cited

U.S. PATENT DOCUMENTS

| | | | | |
|---|---|---|---|---|
| 6,799,049 | B1 * | 9/2004 | Zellner et al. | 455/456.1 |
| 6,934,684 | B2 * | 8/2005 | Alpdemir et al. | 704/265 |
| 2004/0268132 | A1 * | 12/2004 | Waris | 713/185 |
| 2006/0116987 | A1 * | 6/2006 | Bernard | 707/3 |
| 2007/0013516 | A1 * | 1/2007 | Freitag et al. | 340/572.1 |
| 2007/0188299 | A1 * | 8/2007 | Blum | 340/5.25 |
| 2007/0200661 | A1 * | 8/2007 | Blum | 340/5.25 |
| 2007/0270164 | A1 * | 11/2007 | Maier et al. | 455/456.2 |
| 2008/0001735 | A1 * | 1/2008 | Tran | 340/539.22 |
| 2008/0037715 | A1 * | 2/2008 | Prozeniuk et al. | 379/45 |

\* cited by examiner

*Primary Examiner* — Mirza Alam
(74) *Attorney, Agent, or Firm* — Raffi Gostanian

(57) ABSTRACT

A proximity location system and method thereof for locating a communications device. A radio-frequency identification (RFID) proximity location tag is arranged in a proximity of the communications device and detected thereby. A proximity location key included in the RFID proximity location tag is acquired by the communications device and forwarded to a location information server. The location information is queried for location information associated with the proximity location key. Based on the location information, data transmitted by the communications device is routed to the appropriate receiver of the data. The location information is also provided to the receiver.

20 Claims, 2 Drawing Sheets

PROXIMITY LOCATION SYSTEM AND METHOD THEREOF FOR LOCATING A COMMUNICATIONS DEVICE

CROSS-REFERENCE TO RELATED APPLICATIONS

This application is a continuation from U.S. patent application Ser. No. 13/593,595, filed Aug. 24, 2012, and entitled "PROXIMITY LOCATION SYSTEM AND METHOD THEREOF FOR LOCATING A COMMUNICATIONS DEVICE", which is a continuation from U.S. patent application Ser. No. 12/050,308, filed Mar. 18, 2008, and entitled "PROXIMITY LOCATION SYSTEM AND METHOD THEREOF FOR LOCATING A COMMUNICATIONS DEVICE", now issued U.S. Pat. No. 8,269,607, each of which is incorporated by reference herein in its entirety.

BACKGROUND OF THE INVENTION

1. Field of the Invention

Methods and apparatuses consistent with the present invention relate to obtaining location information about a communications device. More particularly, the present invention relates to obtaining the location information about the communications device by acquiring a proximity location key from a proximity location tag proximate to the communications device, forwarding the proximity location key to a location information server, and correlating the proximity location key with location data included in the location information server.

2. Description of the Related Art

In a Voice over Internet Protocol (VoIP)-network, voice data from a communications device, such as a telephone, is transmitted over the Internet or other packet switched network. Packets, i.e., discrete blocks of data, are routed between nodes of an Internet Protocol (IP)-network over data links that are shared with other traffic. In each node of the IP network, the packets are queued or buffered, which leads to variable delay of the packets.

The nature of an IP network makes it difficult, if not impossible, to determine to geographic location of an IP device, such as a VoIP telephone. As result, 9-1-1 emergency phone calls in the United States or Canada, for example, cannot be easily routed to a nearby dispatch call center, or cannot be routed to a dispatch call center at all. Such dispatch call centers are also known as Public Safety Answering Points (PSAP).

In some cases, the only feasible way to convey location information to the PSAP is for the emergency caller to "self-declare" their location by using some kind of Web interface. In other cases, the only feasible way to convey the geographic location of the emergency caller to the PSAP is for the caller to verbally inform the dispatcher at the PSAP about his or her physical location during the emergency call itself. However, sometimes this is not possible since the caller might be calling from an area he or she is not familiar with, and thus, the caller might not know his or her exact geographic location. In addition, sometimes verbally conveying the geographic location of the caller to the PSAP dispatcher might not be possible because the caller might be injured and therefore unable to speak, or the caller might be in duress situations that do not allow him or her to speak.

Global Positioning System (GPS) technology is sometimes used to locate a communications device in a cellular network, for example. However, such systems require "line of sight" to the appropriate GPS satellites. In addition, location determination based on GPS is often not possible when the communications device is located in an indoor environment, such as a home, office building, or shopping mall.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for locating a communications device.

The present invention also provides a proximity location system for locating a communications device.

Further still, the present invention provides a communications device having various structures to assist in locating the communications device.

According to an aspect of the invention, there is provided a method for locating a communications device, wherein data is transmitted from the communications device to a receiver, and wherein a proximity location tag in a predetermined proximity of the communications device is detected. A proximity location key is sent from the proximity location tag to the communications device, and a location information server is queried for location information that is associated with the proximity location key. Based on the location information, the data transmitted from the communications device is routed to the receiver. In addition, the location information is provided to the receiver.

According to another aspect of the invention, there is provided a proximity location system that includes a communications device having a transmitter and a detector. The proximity location system further includes a proximity location tag that is arranged in a predetermined proximity of the communications device. The proximity location tag is detected by the detector of the communications device and includes a proximity location key that is sent to the communications device. A location information server includes location information associated with the proximity location key. A receiver receives data from the transmitter of the communications device and, based on the location information, an intermediate server routes the data transmitted from the communications device to the receiver and provides the location information from the location information server to the receiver.

According to yet another aspect of the invention, there is provided a communications device that includes a detector, an acquisition component, and a transmitter. The detector detects a proximity location tag that is arranged in a predetermined proximity of the communications device. The proximity location tag includes a proximity location key that is acquired by the acquisition component of the communications device. The transmitter transmits the proximity location key to a location information server that includes location information associated with the location of the communications device.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which.

DETAILED DESCRIPTION OF EXEMPLARY EMBODIMENTS OF THE INVENTION

Reference will now be made in detail to exemplary embodiments of the present invention, examples of which are illustrated in the accompanying drawings.

Figure 1:
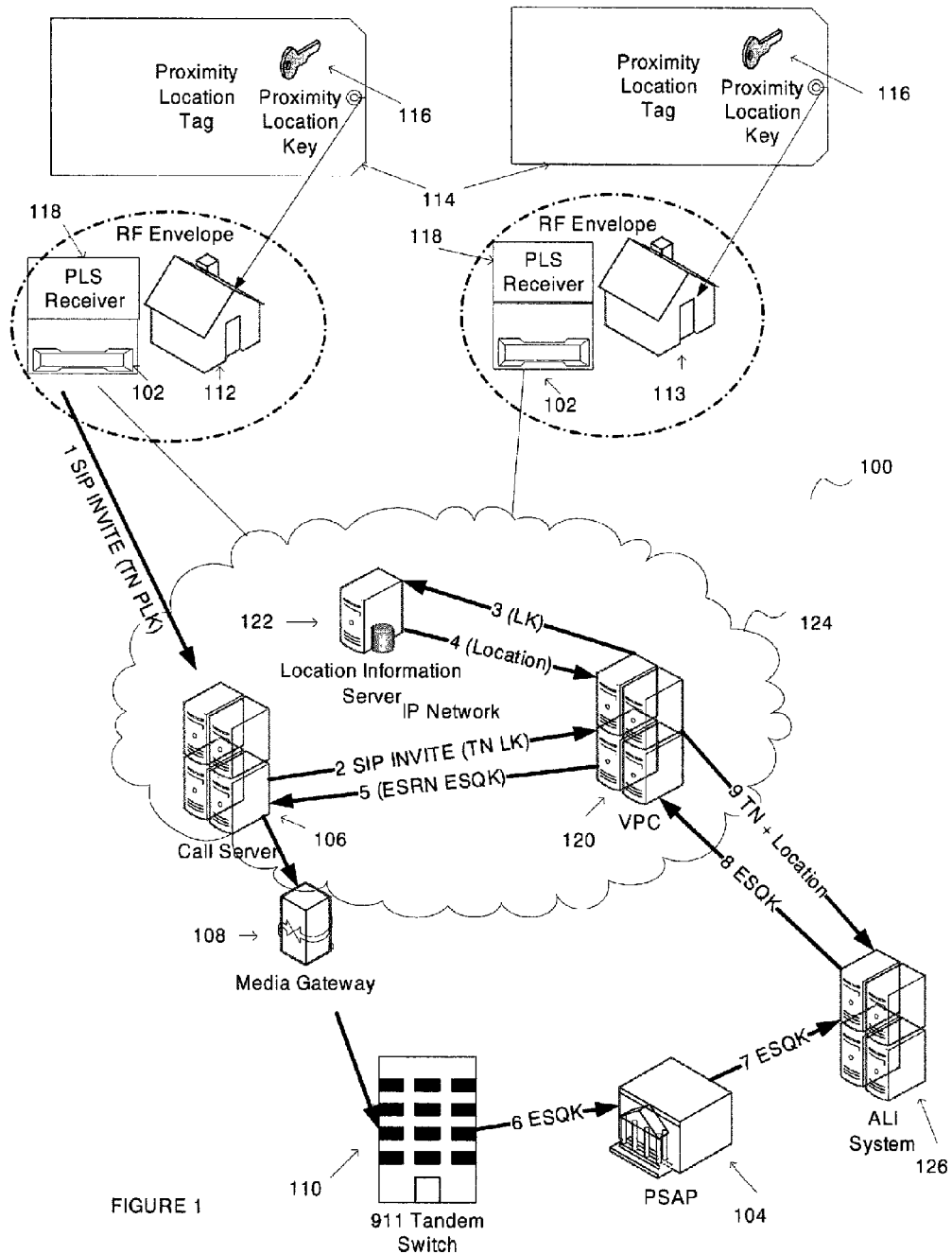
FIG. 1 illustrates a communication system including a proximity location tag and a location information server according to an exemplary embodiment of the present invention.

FIG. 1 illustrates a communication system 100 according to an exemplary embodiment of the present invention. The communication system 100 may also be known as a Proximity Location System (PLS).

In the exemplary embodiment shown in FIG. 1, a communications device 102 transmits data to a Public Safety Answering Point (PSAP) 104 via a call server 106, a media gateway 108, and a 911 Tandem Switch 110. The communications device 102 may be located in an indoor environment, such as a home 112. The indoor environment may also be an office building, a shopping mall, a museum, or any other building or enclosed structure (not shown).

The communications device 102 may be a telephone, such as a Voice over Internet Protocol (VoIP) telephone or wireless telephone, or a Personal Digital Assistant (PDA), for example. The communications device 102 may place an emergency call, such as a 9-1-1 call in the United States and Canada, to the PSAP 104. The PSAP 104 may then dispatch an appropriate emergency response team, such as the police department or the fire department, to the home 112.

A proximity location tag 114, such as a Radio Frequency Identification (RFID) tag, may be located in the home 112. For example, the proximity location tag 114 may be applied to the surface of an object, such as a door or a wall, in or about the home 112. The proximity location tag 114 may be tiny and inconspicuous and require little or no power to operate. Alternatively, the proximity location tag 114 may be embedded, or even implemented as software instructions in a component of the communication system 100.

The proximity location tag 114 may include a proximity location key 116 that may contain data or information associated with the location of the home 112 and/or the communications device 102. The proximity location key 116 may be globally unique, i.e., the proximity location key 116 may be unique to each proximity location tag 114. For example, in FIG. 1, the proximity location key 116 of the proximity location tag 114 in the home 112 may be different from the proximity location key 116 of the proximity location tag 114 in the home 113. Algorithms may be used to ensure that the proximity location key 116 in each proximity location tag 114 is unique regardless of where in the world it is manufactured and used.

If the communications device 102 is in sufficient proximity of the proximity location tag 114, a detector or receiver 118 of the communications device 102 may detect the presence of the proximity location tag 114. The detector or receiver 118 may also be known as a Proximity Location System (PLS) receiver. Using RFID technology, for example, the communications device 102 may acquire the proximity location key 116 from the proximity location tag 114. As the communications device 102 changes location, the communications device 102 may sense that it is no longer in sufficient proximity of the proximity location tag 114 and may consider its location to be unknown until it detects another proximity location tag 114.

If the communications device 102 places a 9-1-1 phone call, for example, and if the communications device 102 has acquired the proximity location key 116 from the proximity location tag 114, the communications device 102 may pass the proximity location key (PLK) 116 and a telephone number (TN) of the communications device 102 to a Voice over Internet Protocol Position Center (VPC) 120 via the call server 106.

As shown in FIG. 1, the telephone number TN and the PLK 116 may be embedded in a Session Initiation Protocol (SIP) INVITE message that is transmitted from the communications device 102. More specifically, a SIP User Agent (SIP UA) (not shown) may pass the PLK 116 in the SIP INVITE message. In the example of a 9-1-1 call, the SIP INVITE message may store the PLK 116 in a Presence Information Data Format-Location Object (PIDF-LO) (not shown). The PDIF-LO may then be passed to the VPC 120 via the call server 106.

As known in the related art, the Session Initiation Protocol (SIP) is an application-layer control (signaling) protocol for creating, modifying, and terminating sessions with one or more participants. It can be used to create two-party, multiparty, or multicast sessions that include Internet telephone calls, multimedia distribution, and multimedia conferences, for example. As also known in the related art, a VPC passes location information to a wide variety of VoIP infrastructure.

In the exemplary embodiment shown in FIG. 1, the VPC 120 may extract the PLK 116 from the SIP INVITE message, or, more particularly, from the PIDF-LO. The VPC 120 may forward the PLK 116 to a location information server 122 in order to query the location information server 122 for location information associated with the PLK 116. The call server 106, the VPC 120, and the location information server 122 may be part of a network 124, such as an Internet Protocol (IP) network. The location information in the location information server 122 may be Master Street Address Guide (MSAG)-valid information. As known in the related art, a Master Street Address Guide is a database of street names containing address ranges with their associated communities that defines emergency service zones for 9-1-1 purposes. A provisional process may be used by the 9-1-1 jurisdictional authority to build a database that includes the location information in the location information server 122.

In the exemplary embodiment shown in FIG. 1, the VPC 120 may use the location information provided by the location information server 122 to route the 9-1-1 call from the communications device 102 to the appropriate PSAP 104. In some cases, the appropriate PSAP 104 may be the PSAP that is closest to the home 112. In other cases, the appropriate PSAP may be the PSAP that has jurisdictional authority over the area in which the home 112 is located or over the type of emergency reported by the caller. In still other cases, alternative or additional criteria may be used to determine which PSAP 104 is the appropriate one for a particular 9-1-1 call.

More specifically, the VPC 120 may use the location information provided by the location information server 122 to forward an Emergency Service Routing Number (ESRN) and/or an Emergency Service Query Key (ESQK) to the call server 106. The call server 106 may then process the ESRN and/or the ESQK to properly route the 9-1-1 call from the communications device 102 to the appropriate PSAP 104 via the media gateway 108 and the 911 Tandem Switch 110.

The PSAP 104 may use the ESQK to query an Automated Location Information (ALI) system 126 for the telephone number TN and the location information associated with the communications device 102 that placed the 9-1-1 call. As known in the related art, an ALI system may be a system that has a database including address information associated with a given telephone number, and that is generally maintained by an Incumbent Local Exchange Carrier (ILEC) under contract by the PSAP 104. The ALI system 126 may forward the ESQK to the VPC 120 to retrieve the telephone number TN and the location information provided by the location information server 122. The telephone number TN and the location information thus obtained may then be automatically displayed at the PSAP 104.

In another exemplary embodiment of the present invention, a visitor of a shopping mall (not shown) may download a map of the mall into his or her communications device 102, such as a PDA. Each store in the mall may be equipped with a proximity location tag 114. The PDA may detect the presence of a particular proximity location tag 114, and the associated proximity location key 116 may be used to determine the visitor's location in the mall. If the visitor wants to visit a specific store in the mall, for example a coffee shop, the map of the mall on the visitor's PDA may show his or her current location and the location of the coffee shop. Using this information, the visitor may be able to easily find his or her way to the coffee shop.

In yet another exemplary embodiment of the present invention, each room of a large building (not shown) may be provided with a proximity location tag 114. A fire department may create a pre-fire plan or map of the building, and a detailed room-by-room plan or map of the structure. A fire fighter's air pack may be equipped with an appropriate communications device 102, and, in conjunction with the ability to communicate over WIFI with the remote location information server 122 or with a Geographic Information System (GIS) (not shown), the fire fighter's current location in the building and the plan or map of the building may be displayed on the air pack's face screen. Thus, the fire fighter may use the display on the face screen to move from room to room without the aid of sight. Therefore, in a smoke-filled building, the success rate of search and rescue missions would be greatly improved.

In still another exemplary embodiment of the present invention, a proximity location tag 114 may be placed in each office of a skyscraper. The communications device 102, such as a VoIP telephone, may place a 9-1-1 call from a particular office in the skyscraper. The location information associated with the proximity location key 116 of the particular proximity location tag 114 in that office may be used by the PSAP 104 to determine which office the communications device 102 is calling from.

In a further exemplary embodiment of the present invention, a visitor to a museum (not shown) may use his or her communications device 102, such as a PDA, to download detailed information about a particular object exhibited in the museum. A proximity location tag 114 may be placed near or at the object in question. If the visitor's PDA is in sufficient proximity of the proximity location tag 114, the location information server 122 of the museum may determine that the visitor is currently located near that object. The location information server 122 may then download a link to the PDA which the visitor can use, for example for a small fee, to access the detailed information about the object.

Further still, in another exemplary embodiment of the present invention, each conference room in an office building (not shown) may be equipped with a proximity location tag 114. A visitor unfamiliar with the office building may use his or her communications device 102, such as a PDA, to find a particular conference room in the building.

In another exemplary embodiment of the present invention, the location information itself may be embedded in the proximity location tag 114, rather than the proximity location key 116. This may be preferable if the communications device 102 is located in a mall or museum, as described above, for example.

In a further exemplary embodiment of the present invention, the communications device 102 may detect the presence of multiple proximity location tags 114 simultaneously. This may be the case if every room in a building or structure is equipped with a proximity location tag 114, and if the radio frequency (RF) envelope of the communications device 102 is too wide. In this case, the communications device 102 may automatically adjust the RF output in an attempt to limit the size of the RF envelope until only the closest proximity location tag 114 is detected. Alternatively, the SIP INVITE message may be constructed in such a way so as to pass all the proximity location keys 116 known to the communications device 102. Algorithms in the VPC 120 may determine the proper routing of the data transmitted from the communications device 102 by assuming that all the proximity location keys 116 point to locations that are very close to each other. The location information provided from the location information server 122 to the PSAP 104, for example, may indicate that the caller may be in any of several locations that are all very close to each other.

In yet another exemplary embodiment of the present invention, the communications device 102 may be a wireless device, whose location can be tracked in real time as it changes location in a building, such as a commercial or government building or campus. For example, the communications device 102 may be wireless telephone that is not part of a cellular network. The wireless communications device 102 may be attached to or associated in software with, for example, telecommunication, data communication, or Centrex service equipment, i.e., Customer Premises Equipment (CPE). As known in the related art, CPE may include any terminating equipment (such as terminals, telephones, and modems) supplied by the telephone company, installed at customer site and connected to the telephone company network. CPE may also refer to any telephone equipment residing at a customer site.

If the wireless communications device 102 transmits data, such as data associated with a 9-1-1 emergency phone call placed by the wireless communications device 102, the appropriate PSAP 104 may be able to accurately report, in real time, the location of the wireless communications device 102 within a radius of, for example, 50 to 200 feet. This information may be reported, via Automatic Number Identification (ANI), to a system, for example the communication system 100, which may then track ALI information for the corresponding in-building base station that the 9-1-1 call originated from. As known in the related art, ANI is a service that a telephone company service provides to report the telephone number of the calling party electronically to the called party.

Figure 2:
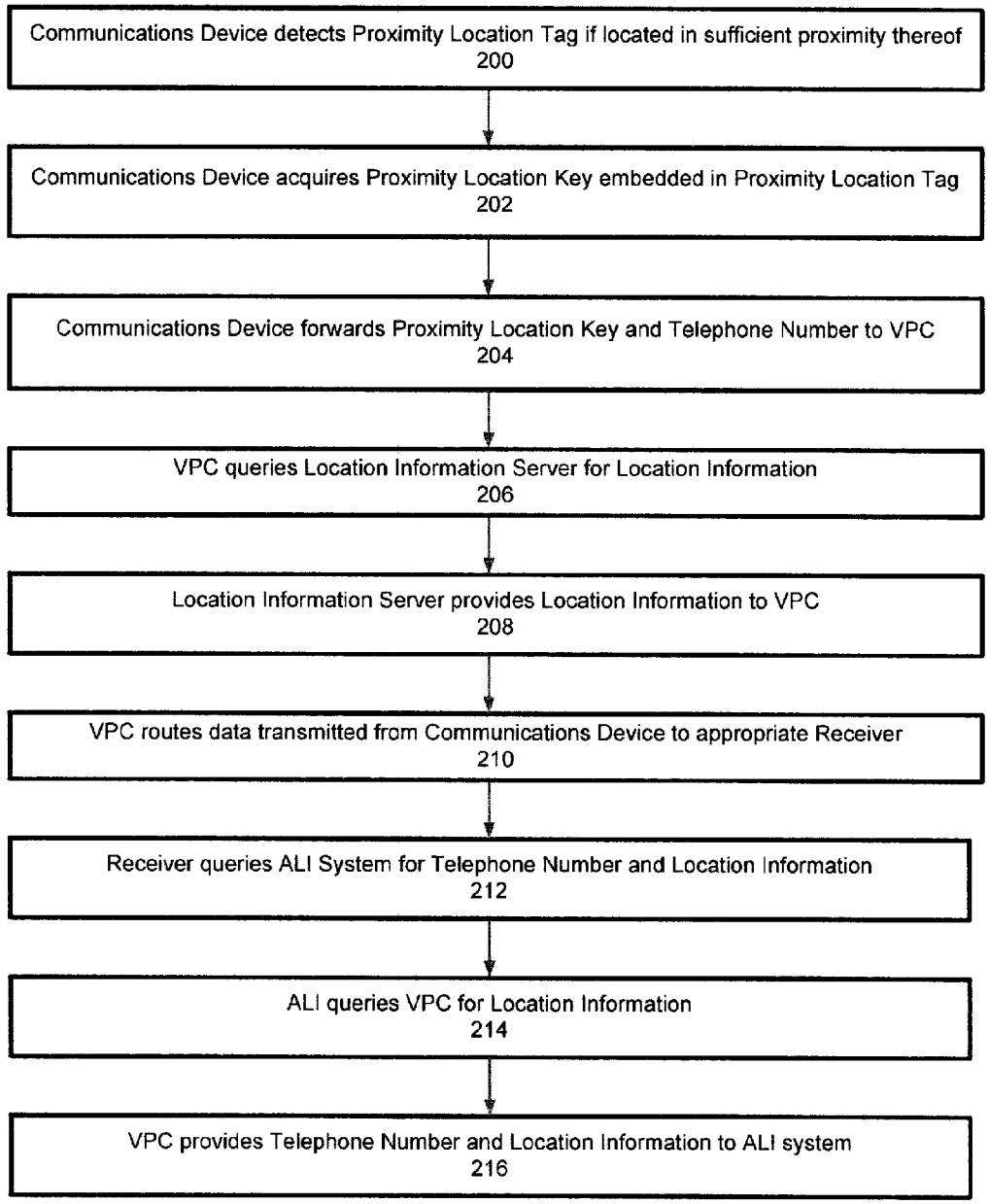
FIG. 2 is a flowchart of a method for communication between a communications device and a location information server according to an exemplary embodiment of the present invention.

FIG. 2 shows a flowchart of an exemplary embodiment of the method in accordance with the present invention.

In step 200, a communications device detects a proximity location tag if the communications device is in sufficient proximity thereof. In step 202, the communications device acquires a proximity location key that is embedded in the proximity location tag. The proximity location key contains information associated with the location of the communications device. In step 204, the communications device forwards the proximity location key and the communications device's telephone number to a Voice over Internet Protocol Position Center (VPC) via a call server. In step 206, the VPC queries a location information server for location information associated with the proximity location key. In step 208, the location information server provides the location information to the VPC and, in step 210, based on the location information thus provided, the VPC routes data transmitted from the communications device to an appropriate receiver. For example, the transmitted data may be data in connection with a 9-1-1 emergency phone call that is placed by the communications device, and the receiver of the data may be an appropriate Public Safety Answering Point (PSAP) answering such 9-1-1 calls. In step 212, the PSAP queries an automated location information (ALI) system for the telephone number and the location information associated with the communications device. In step 214, the ALI system, in turn, queries the VPC for the location information, and, in step 216, the VPC provides the telephone number and the location information to the ALI system.

Although a few exemplary embodiments of the present invention have been shown and described, the present invention is not limited to the described exemplary embodiments. Instead, it would be understood by those skilled in the art that changes may be made to these exemplary embodiments without departing from the principles and spirit of the invention, the scope of which is defined by the claims and their equivalents.

What is claimed is:

1. A method, comprising:
   detecting, by a communication device, a plurality of proximity location tags, each of the plurality of proximity location tags comprising a proximity location key identifying a location of one of the plurality of proximity location tags;
   detecting a closest proximity location tag of the plurality of proximity location tags;
   receiving, by the communication device, the proximity location key from the closest proximity location tag;
   embedding, by the communication device, the proximity location key of the closest proximity location tag in a message and forwarding the message to a Voice over Internet Protocol Position Center (VPC);
   querying, by the VPC, a location information server for location information associated with the proximity location key of the closest proximity location tag;
   providing, by the VPC, the location information to a receiver; and
   as the communications device changes location, when the communications device senses that it is no longer in sufficient proximity to any proximity location tags, determining, by the communications device, that the location of the communications device is unknown until the communications device detects one or more proximity location tags.

2. The method according to claim 1, wherein the communications device comprises at least one of a wireless telephone, a Voice over Internet Protocol (VoIP) telephone, and a personal digital assistant (PDA).

3. The method according to claim 1, further comprising transmitting data from the communications device to the receiver, wherein the data comprises at least one of voice, text, and video data.

4. The method according to claim 1, wherein each of the plurality of proximity location tags comprise a Radio Frequency Identification (RFID) device that is applied to an object located in the predetermined proximity of the communications device.

5. The method according to claim 1, wherein, each of the plurality of proximity location tags comprise a non-transitory computer-readable medium comprising computer-executable instructions, and wherein, when executed, the computer-executable instructions are configured to provide the proximity location key.

6. The method according to claim 1, wherein the proximity location key of the closest proximity location tag is unique to the closest proximity location tag.

7. The method according to claim 1, wherein the communications device comprises a Radio Frequency Identification (RFID) component configured to receive the proximity location key from the closest proximity location tag of the closest proximity location tag.

8. The method according to claim 1, wherein the receiver comprises a Public Safety Answering Point (PSAP).

9. The method according to claim 1, wherein the VPC is configured to extract the proximity location key from the message.

10. The method according to claim 1, wherein the VPC is configured to query the location information server for Master Street Address Guide (MSAG) valid location information.

11. The method according to claim 1, wherein the VPC is configured to route data to a predetermined Public Safety Answering Point (PSAP) based on the Master Street Address Guide (MSAG) valid location information.

12. A system, comprising:
    a plurality of proximity location tags, each of the plurality of proximity location tags comprising a proximity location key identifying a location of one of the plurality of proximity location tags;
    a communication device configured to;
      detect a closest proximity location tag of the plurality of proximity location tags,
      receive the proximity location key from the closest proximity location tag,
      embed the proximity location key of the closest proximity location tag in a message, and
      as the communications device changes location, when the communications device senses that it is no longer in sufficient proximity to any proximity location tags, the communications device is configured to determine that the location of the communications device is unknown until the communications device detects one or more proximity location tags; and
    a Voice over Internet Protocol Position Center (VPC) configured to receive the message from the communication device, query a location information server for location information associated with the proximity location key of the closest proximity location tag, and transmit the location information and to a receiver, wherein
    the location information comprises Master Street Address Guide (MSAG) valid location information, and the VPC is configured to extract the proximity location key from the message and to query the location information server for the MSAG-valid location information.

13. The system according to claim 12, wherein the communications device comprises at least one of a wireless telephone, a Voice over Internet Protocol (VoIP)-telephone, and a personal digital assistant (PDA).

14. The system according to claim 12, wherein the data comprises at least one of voice, text, and video data.

15. The system according to claim 12, wherein each of the plurality of proximity location tags comprise a Radio Frequency Identification (RFID) device applied to an object located in a predetermined proximity of the communications device.

16. The system according to claim 12, wherein the proximity location key of the closest proximity location tag is unique to the closest proximity location tag.

17. The system according to claim 12, wherein the communication device further comprises a Radio Frequency Identification (RFID) component configured to receive the proximity location key from the closest proximity location tag.

18. The system according to claim 12, wherein the closest proximity location tag is located in a predetermined proximity of the communications device.

19. The system according to claim 12, wherein the communication device is configured to receive the proximity location key from the closest proximity location tag when the communication device is proximate to the plurality of proximity location tags.

20. An apparatus, comprising:
   a detector configured to:
      detect a plurality of proximity location tags when the apparatus is proximate to the plurality of proximity location tags, each of the plurality of proximity location tags comprising a proximity location key that identifies a location of one of the plurality of proximity location tags,
      detect a closest proximity location tag of the plurality of proximity location tags, and
      as the apparatus changes location, when the detector senses that the apparatus is no longer in sufficient proximity to any proximity location tags, the detector is configured to determine that the location of the apparatus is unknown until the detector detects one or more proximity location tags;
   an acquisition component configured to receive the proximity location key from the closest proximity location tag; and
   a transmitter configured to transmit a message comprising the proximity location key to a voice over internet protocol position center (VPC), wherein
   the location comprises Master Street Address Guide (MSAG) valid location information, and the VPC is configured to extract the proximity location key from the message and to query the location information server for the MSAG-valid location information.

* * * * *